United States Patent
Frantz

(10) Patent No.: US 7,243,514 B2
(45) Date of Patent: Jul. 17, 2007

(54) METHOD AND DEVICE FOR SECURING AN ELECTRONIC INSTRUMENT TO A BRACKET

(76) Inventor: Don Frantz, 1785 S. Johnson Rd., New Berlin, WI (US) 53146

( * ) Notice: Subject to any disclaimer, the term of this patent is extended or adjusted under 35 U.S.C. 154(b) by 5 days.

(21) Appl. No.: 10/571,386

(22) PCT Filed: Sep. 10, 2003

(86) PCT No.: PCT/US03/28268

§ 371 (c)(1),
(2), (4) Date: Mar. 10, 2006

(87) PCT Pub. No.: WO2005/035924

PCT Pub. Date: Apr. 21, 2005

(65) Prior Publication Data

US 2007/0131002 A1    Jun. 14, 2007

(51) Int. Cl.
*E05B 73/00* (2006.01)
(52) U.S. Cl. .................... 70/58; 70/62; 70/218; 70/231; 70/232; 248/553; 411/910
(58) Field of Classification Search ................. 70/58, 70/62, 149, 175–180, 188, 189, 218, 221–224, 70/229–232, 422, 472; 248/551–553; 411/910
See application file for complete search history.

(56) References Cited

U.S. PATENT DOCUMENTS

| 1,970,660 A | 8/1934 | La Fever |
| 4,081,979 A | 4/1978 | Dawson |
| 5,388,434 A | 2/1995 | Kalis |

*Primary Examiner*—Lloyd A. Gall
(74) *Attorney, Agent, or Firm*—Joseph S. Heino; Patrick M. Bergin

(57) ABSTRACT

A method and device helps to prevent theft of sonar devices and GPS units from the brackets they are normally installed on or mounted to. The present invention provides for a unique locking device having a threaded end. The locking device is capable of alternatively permitting and prohibiting rotation of the threaded end. When a key is turned to lock the device, the handle of the device is permitted to rotate freely and the device does not permit rotation and removal of the threaded end. The device also provides for a hardened spacer that directly abuts the handle such that it prevents a thief from getting access to, and thus cutting the threaded end of the locking device.

17 Claims, 3 Drawing Sheets

METHOD AND DEVICE FOR SECURING AN ELECTRONIC INSTRUMENT TO A BRACKET

FIELD OF THE INVENTION

The present invention relates generally to locks and other security devices. More specifically, it relates to a device and method that is used to secure an electronic instrument to a bracket by replacing a threaded mounting portion of the instrument or of the bracket with a lock mechanism.

BACKGROUND OF THE INVENTION

There are many types of electronic instruments, all of them being relatively expensive, such as marine sonar devices, global positioning devices (GPS), among others, that are designed with threaded holes in opposed sides of the body of the instrument. Normally, these instruments are installed between a U-shaped bracket having circular openings or slots aligned with threaded holes of the instrument. A pair of screws or threaded rods or even handles having threaded ends are used to secure the sonar unit, or GPS, to the bracket. This mounting system allows the instrument to be pivoted to any desired angle for viewing. The addition of slots to the bracket also permits some vertical adjustability in addition to this angular adjustability. Obviously, by tightening the screws, or threaded rods, one can secure both the vertical position of the device and its angle of tilt. In this inventor's experience, boaters prefer electronic instruments such as sonar to be raised off the console so they are more readily visible from a standing position, such as when the driver of the boat is standing at the wheel for better visibility.

Frequently, a ball mount stand is used so that the instrument can be raised and lowered and adjusted infinitely between a fully raised or lowered position. The ball mount stand uses clamping pressure applied by a threaded rod having a handle on it. The stand itself is nothing more than a clamshell design. One end of the clamshell is placed over a ball that is permanently affixed to a surface, such as a console. The other end of the clamshell is placed over a ball that is mounted to the underside of the instrument. The threaded rod is then inserted through threaded apertures in the clamshell design and tightened to the point that the stand maintains its position over the console.

Unfortunately, as easily and conveniently as the aforementioned mounting devices are to install, it is equally as easily to remove them. The valuable nature of GPS units and marine sonar units also makes them an easy potential target for thieves.

SUMMARY OF THE INVENTION

What is needed is a method and device for securely and inexpensively locking instruments to brackets. The present invention provides such a method and device that, when used properly, helps to prevent theft of sonar devices and GPS units from the brackets they are normally installed on or mounted to. The present invention provides for a unique locking device having a threaded end. This unique locking device is capable of alternatively permitting and prohibiting rotation of the threaded end. Thus, when a key is turned to lock the device, the handle of the device is permitted to rotate freely and the device does not permit rotation and removal of the threaded end. Furthermore, in the event the potential thief is undeterred, the present invention also provides for a hardened spacer that directly abuts the handle such that prevents a thief from getting access to, and thus cutting the threaded end of the locking device.

DETAILED DESCRIPTION OF THE INVENTION

Figure 1:
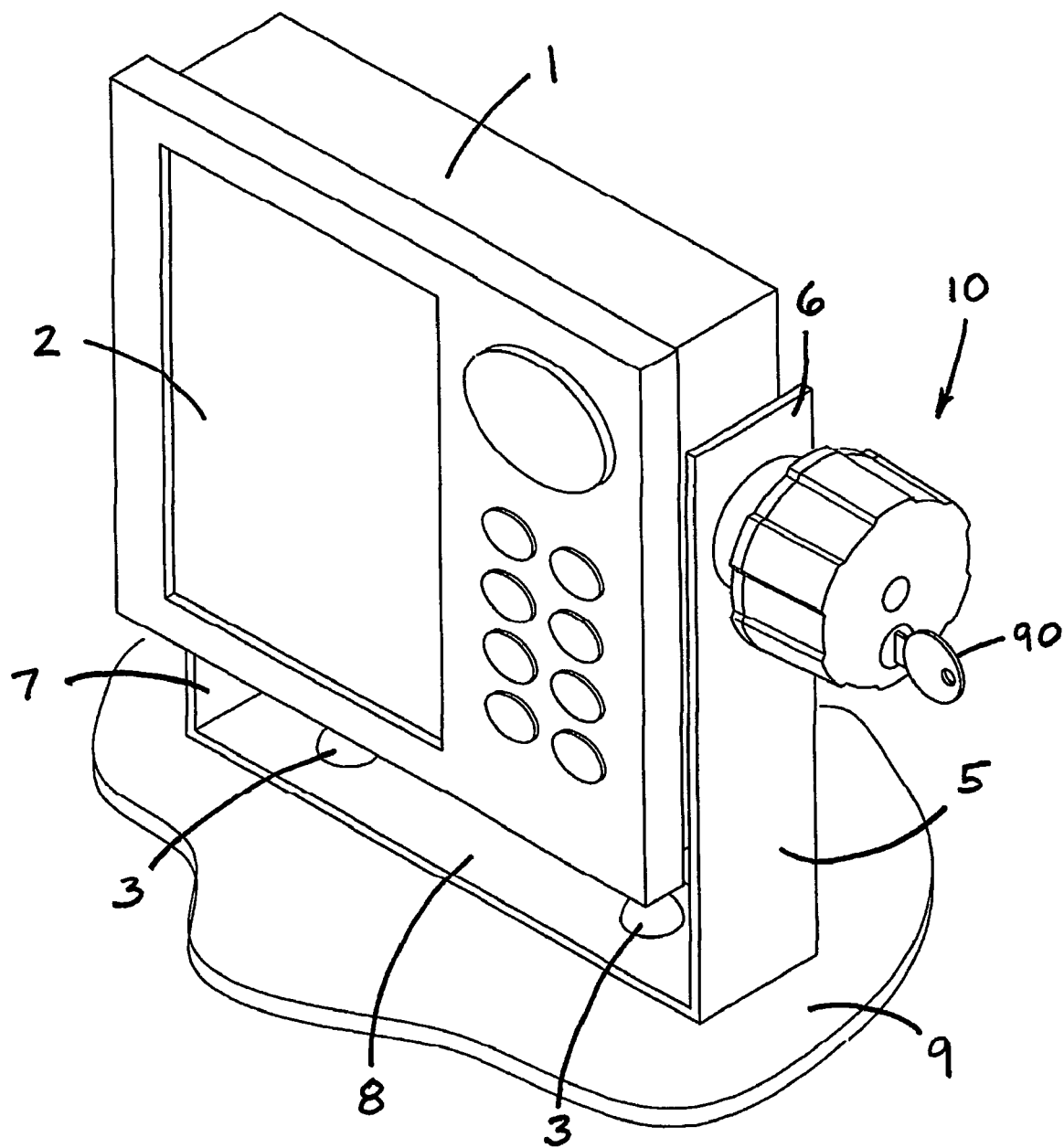
FIG. 1 is a perspective view of the locking device of the present invention as it is used with an electronic instrument mounted to and enclosed in a U-shaped bracket.

Referring now to the drawings in detail, wherein like numbered elements correspond to like elements throughout, FIG. 1 is a perspective view showing the locking device, generally identified 10, associated with the present invention as it is used with a marine sonar unit I mounted on a U-shaped bracket 5. As shown, the sonar unit 1 includes a display 2 which must be observable by the user. The U-shaped bracket 5 includes a central bracket portion 8 and a pair of upwardly extending bracket arms 6, 7. The U-shaped bracket 5 is then typically permanently affixed to some sort of console 9 by means of fasteners 3 and in full view of the operator of the vessel.

Figure 2:
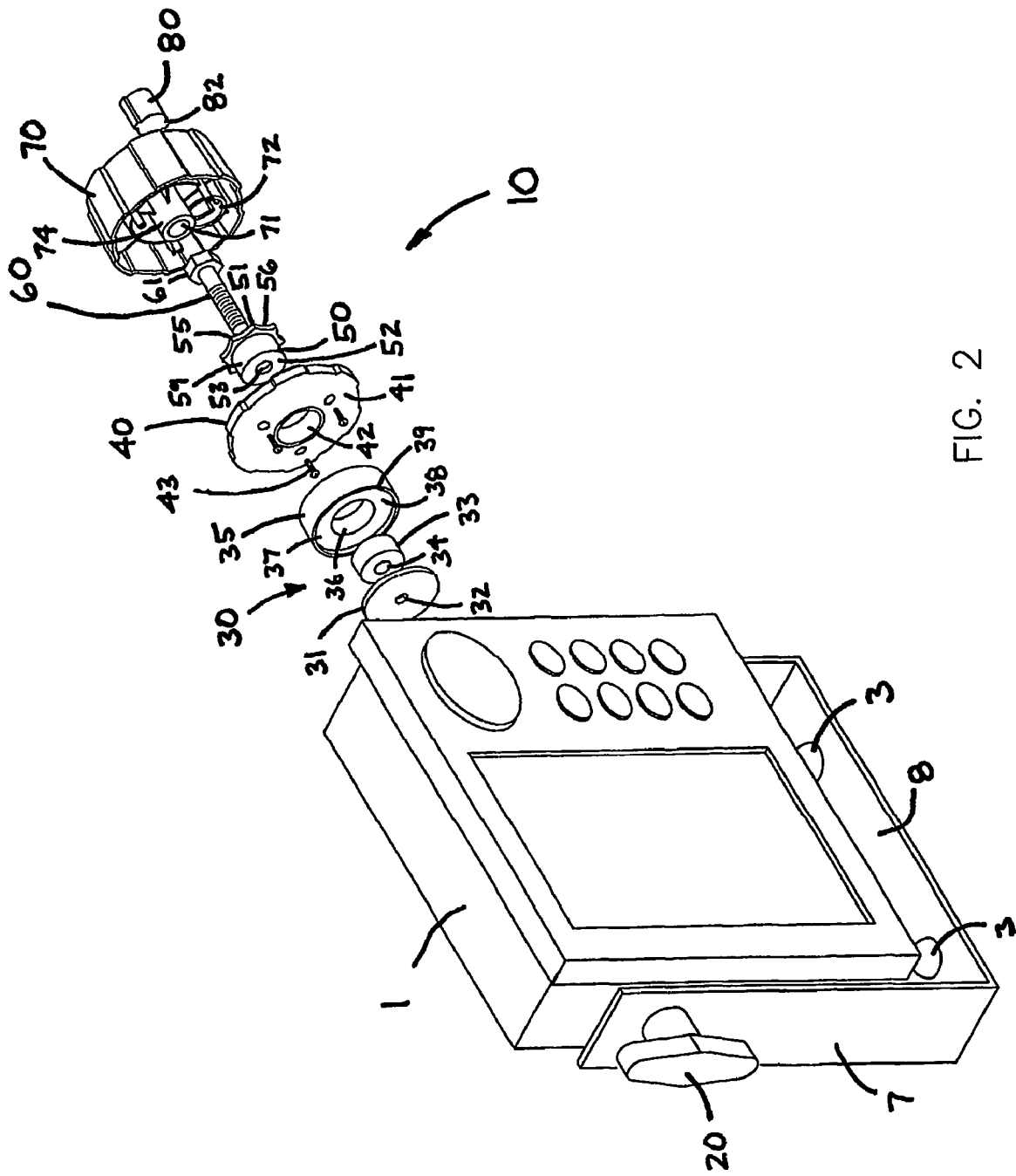
FIG. 2 is an exploded perspective view of the device shown in FIG. 1.
Figure 3:
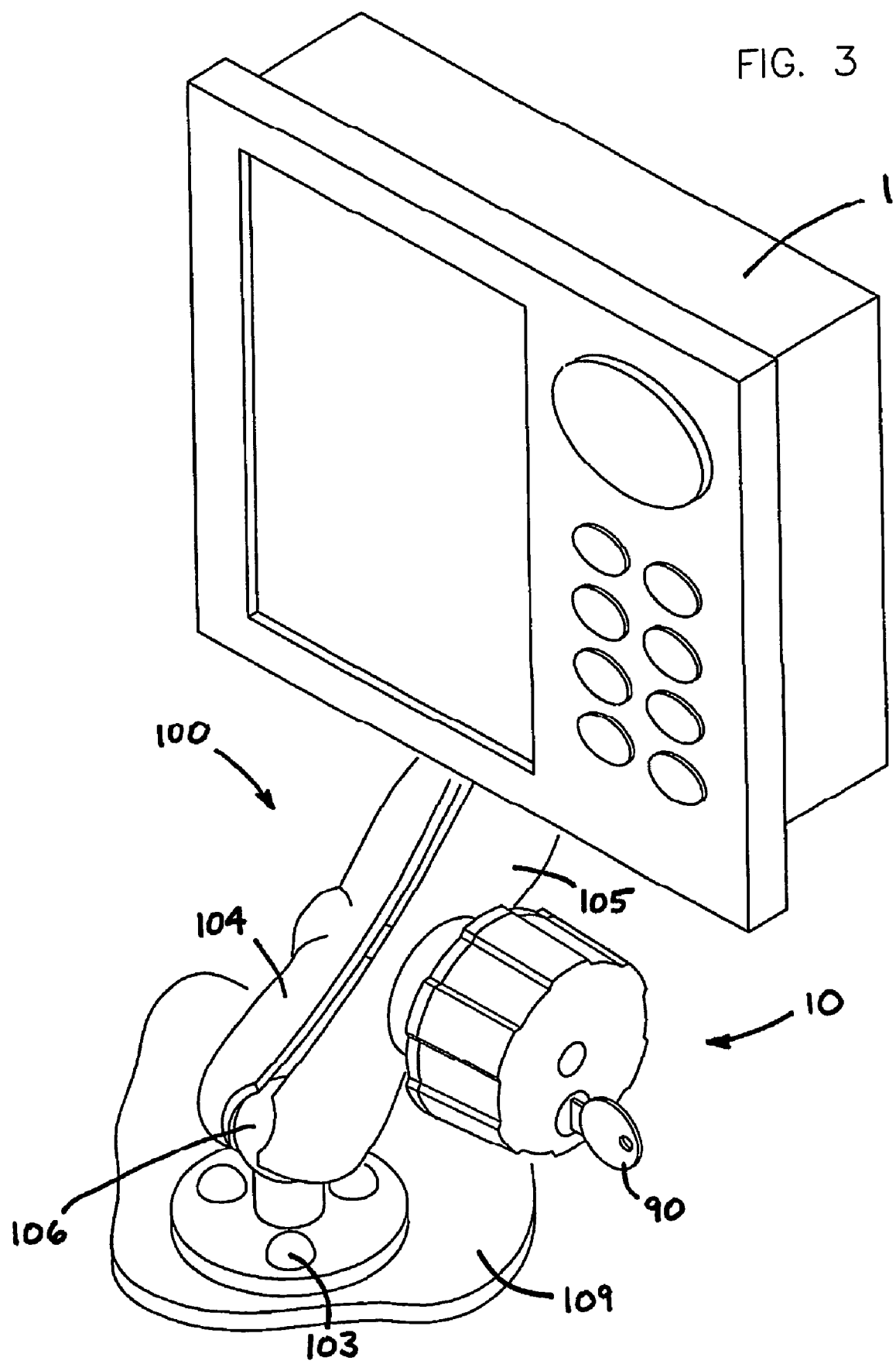
FIG. 3 is a perspective view of the present invention as it would be used with an adjustable ball mount for the instrument.

FIG. 2 is a perspective view showing the detailed structure of the locking device 10 employed in the present invention. FIG. 3 is yet another illustration of the special utility of the method and device of the present invention. In this view, the locking device 10 is used to join a different type of mounting system wherein a ball mount assembly 100 is used.

Referring again to FIG. 2, a handle 20 having a threaded end (not shown) is normally used to attach the instrument 1 to the U-shaped bracket 5. As discussed above, while this type of handle 20 is convenient for boat owners, it is also convenient for thieves. Therefore, as shown in FIG. 1, the present invention provides for a locking device 10 to deter such thieves.

In general, the device of the present invention is comprised of a key 90, a lock cylinder 80, housing 70, bolt 60, interlock 50, housing end 40, and a protective sheath assembly 30. The protective sheath assembly 30 is comprised of a rubber washer 31, a hardened bushing 33 and a large spacer 35. The rubber washer 31 includes a central aperture 32 and the bushing 33 also includes a central aperture 34. The apertures 32, 34 are provided to allow passage of a portion of a bolt 60 through the washer 31 and the bushing 33, respectively. This protective sheath assembly 30 permits rotation of a bolt 60 that passes through the assembly 30 in addition to providing a layer of protection around the bolt 60. That is, the lock device 10 itself does little good unless the bolt 60 is protected. Thieves who would formerly have simply unscrewed the threaded handle 20 to either side of the instrument 1 could simply cut the bolt 60 were it not protected. Therefore, the present invention provides the large spacer 35. The spacer 35 is preferably made of a hardened, shatter resistant, durable material. A first side (not shown) of the spacer 35 is sloped concavely inward towards the center of the spacer 35. The concavity of this side of the spacer 35 is designed to reflect the curvature of the housing end 40 of the locking device 10. In this manner, when the lock is tightened, a potential thief is not able to insert a prying or cutting mechanism between the large spacer 35 and the housing end 40.

The second side 37 of the spacer 35 features a central aperture 36, a recessed area 38 and a ledge 39. The central aperture 36 is situated toward the interior of the spacer 35 and Is functionally adapted to surround the spacer 33. The recessed area 38 permits use of the rubber washer 31 between the spacer 35 and the bracket arm 6. Normally, the rubber washer 31 is slightly thicker than the recessed area 38 of the spacer 35 is deep. This permits the installer to tighten down the bolt 60 until the ledge 39 of the spacer 35 is flush against the bracket arm 6. It is important to have the rubber washer 31 flush against the bracket arm 6 to reduce vibration. The rubber washer 31 is compressed as well when the bolt 60 is tightened down, thus providing some meaningful resistance to the user as the bolt 60 is screwed into the sonar unit 1. The rubber washer 31 also makes it very difficult for a potential thief to access the bolt 60 between the ledge 39 of the spacer 35 and the washer 31, so that, again, the bolt 60 has protection against a potential thief trying to cut the bolt 60.

Within the large spacer 35 is the hardened bushing 33. This hardened bushing 33 is normally fabricated from a durable material and has several purposes. In addition to being a line of defense against the potential that a thief may cut through the spacer 35, it permits free rotation of the spacer 35 around the bushing 33 should a potential thief try to rotate the spacer 35 of the locking device 10 in an attempt to steal the sonar device 1. It should also be noted that the bushing 33 could be fabricated from a different material than the spacer 35 in order to make sawing through the spacer 35 and bushing 33 more difficult.

The housing end 40 is generally fabricated of a durable material which is resistant to cutting and breakage. In terms of shape, the housing end 40 of the present invention has a first convex side 41 and an opposing second side (not shown) which is designed to mate with the housing 70. The housing end 40 includes a central aperture 42. In general, the housing end 40 is attached to the housing 70 using fasteners, such as screws or bolts 43, but any other means of connecting the two are also possible, including the use of adhesives. The housing end 70 itself features a central aperture 71. The central aperture 71 is designed to snugly accommodate the bolt 60 and the interlock device 50.

The housing 70 has a central aperture 71, through which the head of the bolt 61 can be seen. While seen as an aperture when the device 10 is assembled, when disassembled, the aperture 71 forms a circular protuberance 74, the importance of which will be discussed later in this detailed description. The housing 70 also has an offset aperture 72, through which the lock cylinder 80 is inserted and secured. The housing 70 is also fabricated from a durable and resilient material so as to prevent the theft of the object secured.

The lock cylinder 80, said type of lock cylinder not intended to be a restriction of the present invention, and, as such, performing the purpose of identifying whether the appropriate key 90 has been inserted into the cylinder 80 and, if the appropriate key 90 has been inserted, permitting a person to turn the lock cylinder 80. See FIG. 1. In actuation, turning the key 90 in the lock 80 turns the second end 82 of the lock 80. The second end of the lock 82 is generally circular with the exception of one area which is flattened. The purpose of the flattened area will be outlined later in this detailed description.

The interlock 50 includes a hollow cylindrical part 59. The hollow cylindrical part 59 has a first open end 51 and a second end 52 having an aperture 53 through which the bolt 60 is inserted. The bolt 60 is a normal bolt having a head 61, an unthreaded portion, and a threaded portion. The open end of the interlock 51 fits over the protuberance 74 in the housing 70. As shown, the open end of the interlock 51 is almost star-shaped wherein the points outward 55 are connected by arcuate curves 56 which curve inwardly towards the cylindrical portion 59 of the interlock 50. These arcuate curves are designed to accommodate the curve of the outer lock cylinder 80.

The second end of the interlock 52, as mentioned before, has an aperture 53, through which the bolt 60 extends. The bolt 60 can be any standard bolt, but in this embodiment is a hexagonal headed bolt. The inside of the interlock 50 then has a complimentary six-sided aperture (not shown) in which the bolt head 61 rests. In this manner, the head 61 of the bolt 60 is not permitted to rotate with respect to the interlock 50.

The locking device 10 of the present invention is operated by turning a key 90 in the lock cylinder 80 in one direction, wherein the curve of the outside 80 of the lock cylinder 80 matches up with the arcuate curve 56 of the interlock 50, which permits the user to screw in or unscrew the device 10 of the present invention. This corresponds to the "unlocked" position.

The opposite is true of the other lock position. When the lock cylinder 80 has been turned to the other position, the locking device 10 of the present invention is locked. That is, the flat surface of the lock cylinder 80 has been presented to the arcuate curve 56 of the interlock 50. In this position, a potential thief can rotate the housing 70 freely and it has absolutely no effect on the relative position of the bolt 60 with respect to the sonar unit 1 it is protecting. This corresponds to the "locked" position.

FIG. 3 shows yet another use for the locking device 10 of the present invention. As shown in FIG. 3, the locking device 10 is used to secure the clamshell mounts 104, 105 to the ball mount 106 of the ball mount assembly 100. The ball mount 106 is attachable to a console or other surface 109 by means of fasteners 103. The height and position of the sonar unit 1 is then adjustable by simply loosening the locking device 10 as previously described.

The present invention also provides a method for using the locking device 10 described above. More particularly, the present method provides for the steps of using a locking device 10, wherein the locking device 10 has a threaded end and is inserted into a threaded aperture to secure something, for example, a marine sonar device 1, to a bracket 5. See FIG. 1. The present method provides for the steps of using the locking device 10 having a threaded end 60, and providing a large spacer assembly 30 between said locking device 10 and said bracket 5. The method of the present invention may also include the step of using a large spacer 35 having an inner diameter aperture 36 that is larger than that of the threaded end 60, wherein a bushing 33 could be inserted between the spacer 35 and the threaded rod 60 such that the spacer 35 is free to rotate independent of the bushing 33. The method of the present invention would normally provide a spacer 35 that would be designed to accommodate the housing end 40 of the locking device 10. For example, the method of the present invention provides for a spacer 35 having a concave end with a curve matching that of the housing end 40 such that it would be more difficult for a potential thief to damage the bolt 60. The present invention may utilize a single structure for the spacer 35 and housing end 40. The present invention may also include using two different materials for the spacer 35 and the bushing 33.

The method of the present invention may further include the step of selecting materials based on their resistance to cutting or breakage. For example, the spacer 35 material may be selected for its resistance to impact, while the bushing 33 material is resistant to cutting. Additionally the materials may be selected such that, different types of blades are required to cut through the different materials such that perhaps the spacer 35 material would be susceptible to a serrated edge while the bushing 33 was susceptible to a straight edge and ruined the cutting efficiency of the serrated edge to frustrate a potential thief.

The method of the present invention may also provide for the step of using a resilient washer 31 in addition to the spacer 35 and the bushing 33. The method of the present invention would then provide for a recessed area 38 for said resilient washer 31 and even a ledge 39 around the recessed area 38 so as to protect the resilient washer 31 from damage.

In summary, the present invention also provides a method for securing an electronic instrument 1 device having a threaded aperture using a lock device 10 having a threaded rod 60 comprising the steps of: placing the bushing 33 on the threaded rod or bolt 60; placing a spacer 35 over the threaded rod 60 and atop of a bushing 33; and placing a resilient washer 31 in close relation to the spacer 35.

Additional advantages and modifications will readily occur to those skilled in the art. Therefore, the invention in its broader aspects is not limited to the specific details disclosed and described herein. Accordingly, various modifications may be made without departing from the spirit or scope of the general inventive concept.

What is claimed is:

1. A locking device for securing items having a threaded aperture to a bracket having a aperture comprising:
   a lock, the lock having a handle and a threaded rod end, the lock being insertable into the aperture of the bracket and threaded into the item having the threaded aperture, said lock, when locked permitting free rotation of the handle without removing the threaded rod end and when unlocked permitting the locking device to be unthreaded;
   a bushing on the threaded rod end between the lock and the bracket;
   a spacer on the threaded rod end between the lock and the bracket; and
   a rubber washer between the spacer and the bracket.

2. The locking device of claim 1 wherein the lock has a generally convex shape and one side of the spacer has a generally complementary concave shape.

3. The locking device of claim 2 wherein the bushing is bushing fits over the threaded rod between the lock and the bracket and the spacer fits over the bushing.

4. The locking device of claim 3 wherein the spacer has a second side having a recessed area and a ledge around the recessed area.

5. The locking device of claim 4 wherein the rubber washer is inserted into the recessed area and fits generally between the bracket and the spacer.

6. The locking device of claim 5 wherein the bushing and the spacer are fabricated from different materials.

7. A locking device for securing items having a threaded aperture to a bracket having a aperture comprising:
   a lock, the lock having a handle and a threaded rod end, the lock being insertable into the aperture of the bracket and threaded into the item having the threaded aperture, said lock, when locked permitting free rotation of the handle without removing the threaded rod end and when unlocked permitting the locking device to be unthreaded;
   a bushing on the threaded rod end between the lock and the bracket;
   a cylindrical spacer having an aperture, said aperture having a inner diameter larger than the bushing between the lock and the bracket; and
   a rubber washer between the spacer and the bracket.

8. The locking device of claim 7 wherein the lock has a generally convex shape and one side of the spacer has a generally complementary concave shape.

9. The locking device of claim 8 wherein the spacer has a second side having a recessed area and a ledge around the recessed area.

10. The locking device of claim 9 wherein the rubber washer is inserted into the recessed area and fits generally between the bracket and the washer.

11. The locking device of claim 10 wherein the bushing and the spacer are fabricated from different materials.

12. A method for securing a locking device having a threaded rod end and a handle to a bracket, the locking device permitting free rotation of the handle with respect to the stationary threaded rod end when locked and permitting removal or adjustment of the threaded rod end when unlocked comprising the steps of:
   placing a bushing over the threaded rod end;
   placing a spacer over the threaded rod end; and
   placing a rubber washer between the spacer and the bracket.

13. The method for securing a locking device of claim 12 including the step of providing a lock having a generally convex shape and the spacer having a generally complementary concave shape.

14. The method for securing a locking device of claim 13 including the step of providing the bushing that fits over the threaded rod between the lock and the bracket and the spacer fits over the bushing.

15. The method for securing a locking device of claim 14 including the step of providing the spacer having a second side having a recessed area and a ledge surrounding the recessed area.

16. The method for securing a locking device of claim 15 including the step of inserting the rubber washer into the recessed area of the spacer between the spacer and the bracket.

17. The method for securing a locking device of claim 16 including the step of providing the bushing and spacer fabricated from different materials.

* * * * *